United States Patent
Yamada et al.

(10) Patent No.: US 11,977,035 B2
(45) Date of Patent: May 7, 2024

(54) SURFACE SHAPE DETECTION DEVICE AND DETECTION METHOD

(71) Applicant: HITACHI HIGH-TECH CORPORATION, Tokyo (JP)

(72) Inventors: Kenichiro Yamada, Tokyo (JP); Shinsuke Onoe, Tokyo (JP); Makoto Hosaka, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 312 days.

(21) Appl. No.: 17/599,352

(22) PCT Filed: Apr. 8, 2019

(86) PCT No.: PCT/JP2019/015314
§ 371 (c)(1),
(2) Date: Sep. 28, 2021

(87) PCT Pub. No.: WO2020/208680
PCT Pub. Date: Oct. 15, 2020

(65) Prior Publication Data
US 2022/0178846 A1   Jun. 9, 2022

(51) Int. Cl.
*G01N 21/956*   (2006.01)
*G01B 11/25*    (2006.01)

(52) U.S. Cl.
CPC ....... *G01N 21/956* (2013.01); *G01B 11/2518* (2013.01)

(58) Field of Classification Search
CPC .............. G01N 21/956; G01B 11/2518; G01B 9/02019; G01B 9/02083
See application file for complete search history.

(56) References Cited

U.S. PATENT DOCUMENTS 6,128,127 A    10/2000  Kusaka
7,177,020 B2 *  2/2007  Morioka ................ G01N 21/94
                                              356/300

(Continued)

FOREIGN PATENT DOCUMENTS

JP   864-061602 A   3/1989
JP   H10-161031 A   6/1998

(Continued)

OTHER PUBLICATIONS

International Search Report, PCT/JP2019/015314.

*Primary Examiner* — Hung V Nguyen
(74) *Attorney, Agent, or Firm* — Volpe Koenig

(57) ABSTRACT

A surface shape detection device using differential interference optics achieves restoration error reduction of a surface shape while maintaining resolution. The surface shape detection device includes: a light spot scanning unit such as a wafer rotation direction drive unit that scans a wafer surface with a light spot; an interference light detection mechanism such as a differential interference optical system that detects interference light of light obtained by scanning a surface of an inspection target with a plurality of the light spots separated by a predetermined design distance; and a surface shape restoration processing unit such as a wafer surface shape restoration unit that samples, at a predetermined quantization time interval, and calculates information of the interference light, and performs restoration processing on a surface shape of the wafer, in which the predetermined design distance is larger than a quantization distance interval corresponding to the predetermined quantization time interval.

11 Claims, 9 Drawing Sheets

(56) References Cited

U.S. PATENT DOCUMENTS

| | | | |
|---|---|---|---|
| 7,728,969 B2 | 6/2010 | Saito et al. | |
| 8,804,110 B2 * | 8/2014 | Urano | G01N 21/47 356/237.4 |
| 11,143,600 B2 * | 10/2021 | Honda | H01L 22/12 |
| 2002/0188917 A1 | 12/2002 | Yokoyama et al. | |
| 2014/0118721 A1 | 5/2014 | Shyu et al. | |

FOREIGN PATENT DOCUMENTS

| | | |
|---|---|---|
| JP | H10-260358 A | 9/1998 |
| JP | 2002-365235 A | 12/2002 |
| JP | 2004-077609 A | 3/2004 |
| JP | 2009-075034 A | 4/2009 |

* cited by examiner

SURFACE SHAPE DETECTION DEVICE AND DETECTION METHOD

TECHNICAL FIELD

The present invention relates to a surface shape detection technique using a differential interference inspection device.

BACKGROUND ART

As miniaturization of semiconductor devices progresses, accurate measurement of a surface state of a semiconductor wafer has a great influence on device performance and yield.

As a conventional optical method of a device for measuring a surface state of a semiconductor wafer, a device using a differential interference optical method as in PTL 1 or PTL 2, for example, is known.

In PTL 1, defects on wafer surfaces are classified on a rule basis by using a signal comparison result between a signal using scattered light and a signal using differential interference contrast.

In addition, as a device for measuring a surface state of a semiconductor wafer, a differential interference microscope that acquires an epi-illumination differential interference image as in PTL 2 is known. In PTL 2, highly accurate differential interference observation is achieved by a variable shift amount of two light beams called a shear amount. As a means for changing the shear amount, in general, a differential interference microscope separates a light beam using a Nomarski prism processed from a birefringent crystal as described also in PTL 2.

CITATION LIST

Patent Literature

PTL 1: U.S. Pat. No. 7,728,969
PTL 2: JP H10-161031 A
PTL 3: JP S64-61602 A

SUMMARY OF INVENTION

Technical Problem

Generally, in the interference optical system, the shift amount of the phase plane indicating the wavefront shift in the shift direction of the shear amount is measured. The differential interference optical system can only observe the shift amount of the phase plane relative to the shift direction of the shear amount. Thus, the surface shape of the wafer cannot be restored unless the integration calculation of the shift amount of the phase plane is continued. Therefore, in the restoration shape of the wafer surface, the error increases as the number of integration of the random noise, i.e., the number of quantization (sampling) until restoration increases. On the other hand, for example, if the sampling pitch, which is the interval of integration, is increased, the number of times of integration required to restore the surface shape is reduced, and thus the error is also reduced, but in that case, it is trade-off with the resolution in measurement of the surface shape.

An object of the present invention is to solve the above problems and to provide a surface shape detection device and a detection method that achieve reduction of a restoration error of a wafer surface shape while maintaining resolution.

Solution to Problem

In order to achieve the above object, the present invention provides a surface shape detection device including: a light spot scanning unit that scans a surface of an inspection target with a light spot; an interference light detection mechanism that detects interference light of light obtained by scanning a surface of an inspection target with a plurality of the light spots separated by a predetermined design distance; and a surface shape restoration processing unit that samples, at a predetermined quantization time interval, and calculates information of the interference light, and performs restoration processing on a surface shape of an inspection target, in which the predetermined design distance is larger than a quantization distance interval corresponding to the predetermined quantization time interval.

In order to achieve the above object, the present invention provides a surface shape detection method, including: detecting interference light of light obtained by scanning a surface of an inspection target with a plurality of light spots separated by a predetermined design distance, sampling, at a predetermined quantization time interval, and calculating information of the interference light having been detected, and; when restoration processing is performed on a surface shape of the inspection target, making the predetermined design distance larger than a quantization distance interval corresponding to the predetermined quantization time interval.

Advantageous Effects of Invention

According to the present invention, it is possible to achieve reduction of a restoration error of a wafer surface shape while maintaining resolution.

DESCRIPTION OF EMBODIMENTS

An embodiment of the present invention will be described below with reference to the drawings, and in order to facilitate understanding of the contents thereof, problems thereof will be described with reference to mathematical expressions. Generally, the interference optical system measures the shift amount of the phase plane in the shift direction of the shear amount. For the sake of simplicity, thinking in terms of one dimension, in the conventional differential interference optical method, a shift amount $\Delta h(x)$ of the phase plane in the shift direction of the shear amount is expressed by an approximate expression such as Expression 1 (see PTL 3).

[Expression 1]

$$\Delta h(x) = W(x) - W(x - \delta) \quad \text{(Expression 1)}$$
$$= \delta \frac{W(x) - W(x - \delta)}{\delta}$$
$$\approx \delta \frac{dW}{d\delta}$$

Here, d represents the shear amount, and $W(x)$ represents the phase plane from the wafer surface. That is, it is possible to approximate to a value obtained by multiplying the shear amount d by differentiation of the shift direction of the shear amount of the wavefront from the wafer. Furthermore, the surface shape of the wafer is restored by integrating differentiation of the shift direction of the shear amount in a one-dimensional direction in which the surface shape is desired to be restored. For example, a wafer surface height $h(x)$ at a point separated by L from the restoration start point is expressed by Expression 2.

[Expression 2]

$$h(x) = \int_0^L \frac{dW(x)}{d\delta} dx \quad \text{(Expression 2)}$$

Figure 1:
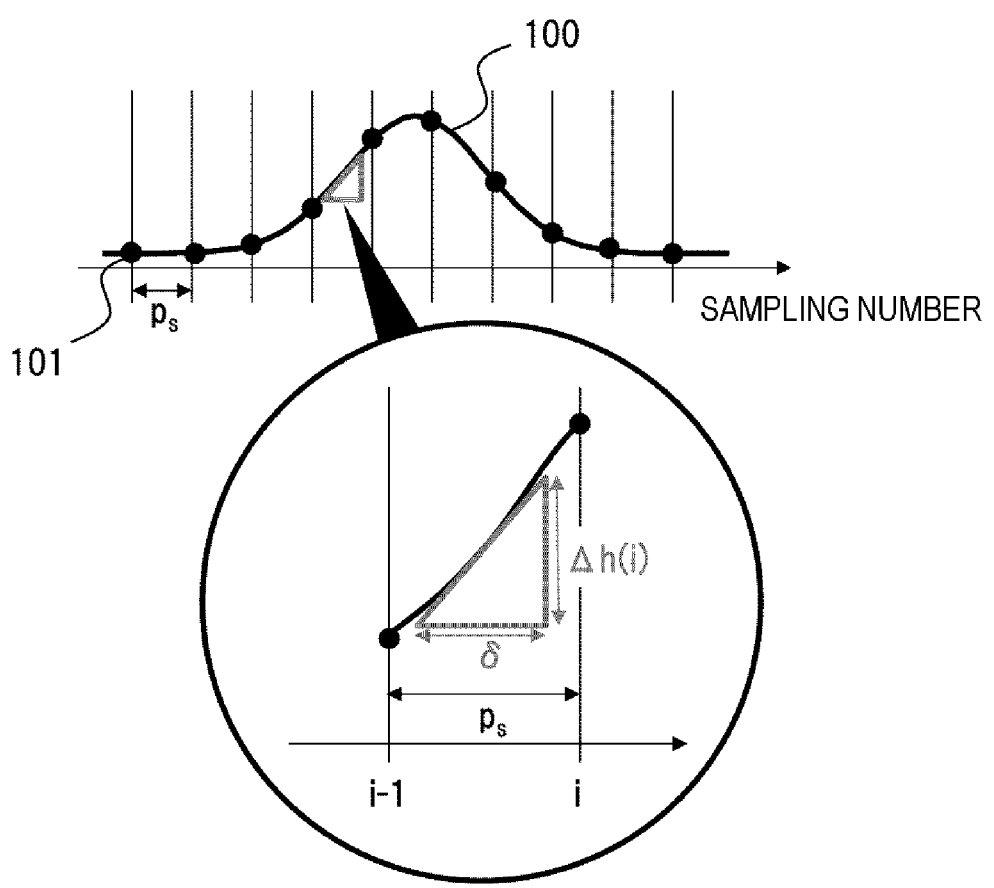
FIG. 1 is a schematic view illustrating a conventional differential interference optical system.

FIG. 1 shows a schematic view of a case where this has a finite value and based on implementation in a surface shape detection device that performs actual quantization, i.e., digital sampling. A solid line 100 represents an actual wafer surface shape, and a black circle 101 represents a wafer surface height in each sampling. Here, $\Delta h(i)$ represents the shift amount of the phase plane in the shift direction of the shear amount in the i-th sampling, and ps represents the sampling pitch. In this case, the wafer surface height $h(i)$ in the i-th sampling is expressed by Expression 3. As in Expression 1, the differential interference optical system can only observe the shift amount $\Delta h$ of the phase plane relative to the shift direction of the shear amount. Therefore, the surface shape of the wafer cannot be restored unless the shift amount of the phase plane is continuously integrated.

Now, a restoration error due to random noise at the time of restoration of the surface shape of an actual wafer is considered. In an actual restoration processing, the luminance of the interference signal is received by a light receiving unit such as a photodiode, converted into an electric signal, and then subjected to output amplification or attenuation by an electric circuit, and sampling by an analog to digital converter (ADC) is performed. Therefore, the signal quality is impaired by superimposing random noise such as shot noise and circuit noise in each sampling. Assuming restoration of the conventional wafer surface shape as in Expression 3, assuming that the shift amount $\Delta h(x)$ of the phase plane is represented by a normal distribution of a standard deviation si with a center value μi in the i-th sampling, a restoration shape $h(N)$ of the wafer surface when added until the N-th integration is represented by the range of Expression 4. For the sake of simplicity, assuming that si is the same s in each sample, the restoration shape $h(N)$ of the wafer surface is expressed in the range of Expression 5.

[Expression 3]

$$h(i) = p_s \frac{\Delta h(i)}{\delta} + h(i-1) \quad \text{(Expression 3)}$$

[Expression 4]

$$h(N) = \sum_{i=0}^{N} \mu_i \pm \sqrt{\sigma_0^2 + \sigma_1^2 + \ldots + \sigma_N^2} \quad \text{(Expression 4)}$$

[Expression 5]

$$h(N) = \sum_{i=0}^{N} \mu_i \pm \sqrt{N} \cdot \sigma \quad \text{(Expression 5)}$$

That is, the larger the number of times of integration of random noise and the number of times of quantization until restoration in Expression 5 is, the larger the error of the restoration shape of the wafer surface becomes. On the other hand, for example, if the interval of integration, in this case, the sampling pitch ps, is increased, the number of times of integration necessary to restore the surface shape is reduced, and thus the error is also reduced. However, as described above, there is a problem that it becomes a trade-off with the resolution in the measurement of the surface shape.

First Embodiment

A first embodiment is an embodiment of a surface shape detection device that can solve the above-described problem, the surface shape detection device including: a light spot scanning unit that scans a surface of an inspection target with a light spot; an interference light detection mechanism that detects interference light of light obtained by scanning a surface of an inspection target with a plurality of the light spots separated by a predetermined design distance; and a surface shape restoration processing unit that samples, at a predetermined quantization time interval, and calculates information of the interference light, and performs restoration processing on a surface shape of an inspection target, in which the predetermined design distance is larger than a quantization distance interval corresponding to the predetermined quantization time interval. In addition, it is an embodiment of a surface shape detection method, including: detecting interference light of light obtained by scanning a surface of an inspection target with a plurality of light spots separated by a predetermined design distance, sampling, at a predetermined quantization time interval, and calculating information of the interference light having been detected, and; when restoration processing is performed on a surface shape of the inspection target, making the predetermined design distance larger than a quantization distance interval corresponding to the predetermined quantization time interval.

Figure 2:
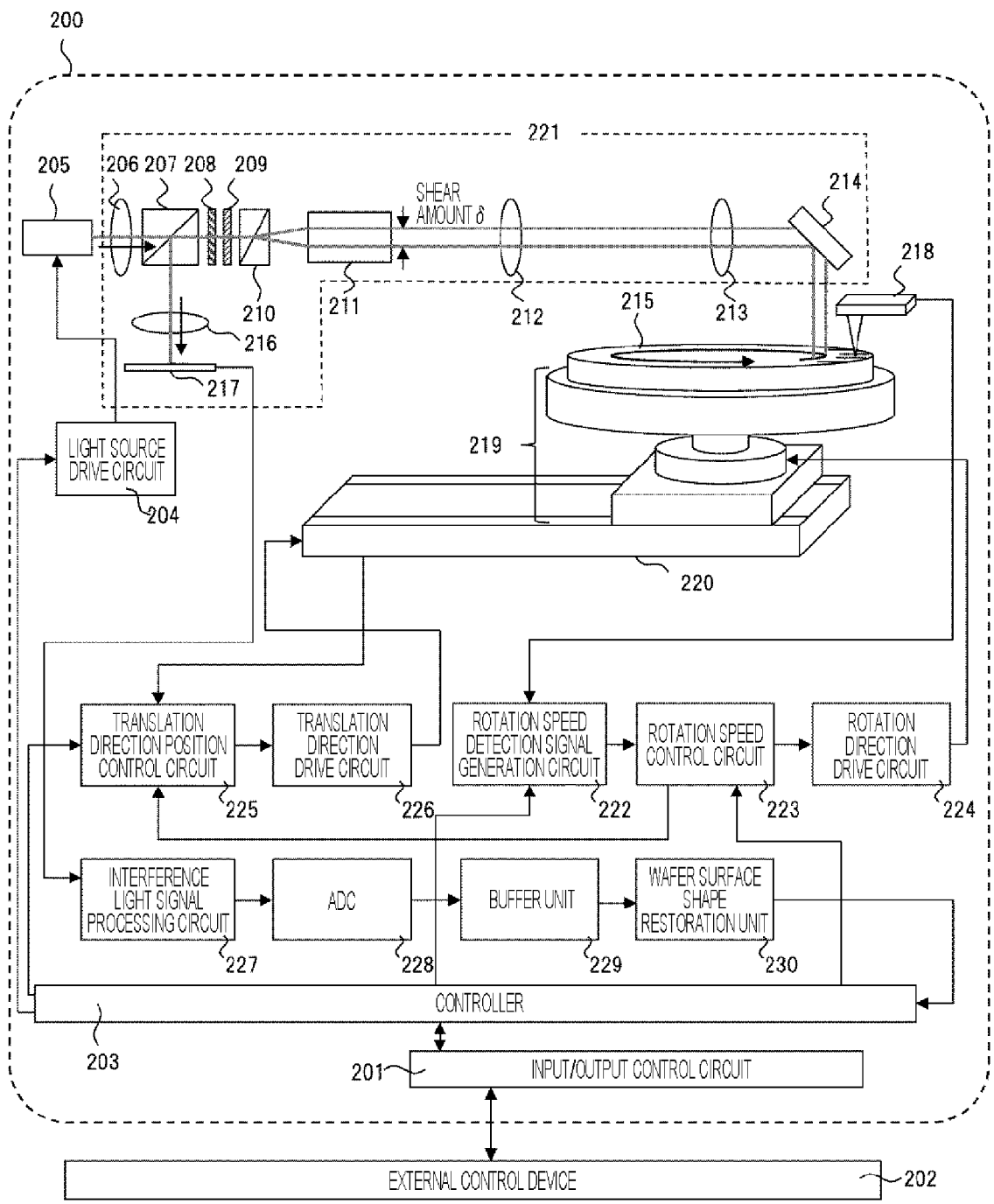
FIG. 2 is a view illustrating a configuration example of a surface shape detection device that detects a shape of a wafer surface using a differential interference optical system according to a first embodiment.

A surface shape detection device of the first embodiment will be described with reference to FIGS. 2 to 5. FIG. 2 is a view illustrating a configuration example of a surface shape detection device that detects the shape of a wafer surface using a differential interference optical system. In the figure, a surface shape detection device 200 is connected to an external control device 202 via an input/output control circuit 201. The input/output control circuit 201 is implemented by a single or a plurality of communication interfaces such as a network adapter and a USB port. When the shape of the wafer surface of a wafer 215 is detected, the surface shape detection device 200 receives, by the input/output control circuit 201, an information signal detected from the external control device 202.

The surface shape detection device 200 includes a light source 205, and a differential interference optical system 221, a rotation speed detection sensor 218, a wafer rotation direction drive unit 219, and a wafer translation direction drive unit 220 that constitute an interference light detection mechanism. The rotation speed detection sensor 218, the wafer rotation direction drive unit 219, and the wafer translation direction drive unit 220 constitute a light spot scanning unit. The surface shape restoration processing unit includes an interference light signal processing circuit 227 that receives a signal from a light receiving element 217 of the differential interference optical system 221 and performs current/voltage (I/V) conversion and the like, an analog to digital converter (ADC) 228, a buffer unit 229, and a wafer surface shape restoration unit 230.

The wafer rotation direction drive unit 219 includes an attachment/detachment portion (not illustrated) that can attach/detach the wafer 215 to/from the rotation shaft, and the wafer is configured to be rotatable by the wafer rotation direction drive unit 219. The position irradiated with the light beam for differential interference is determined by the geometric positional relationship between the differential interference optical system 221 and the wafer 215, and is a position fixed to the device unless the differential interference optical system 221 is changed.

On the other hand, the wafer 215 is configured to be movable in the radial direction by the wafer translation direction drive unit 220, and a position irradiated with the light beam for differential interference in the wafer 215 can be scanned depending on a combination of the wafer rotation direction drive unit 219 and the wafer translation direction drive unit 220. Note that the configuration of the light receiving element 217 is not limited to a single configuration, and may be a configuration including a plurality of light receiving units arranged in a direction substantially perpendicular to the scanning direction, for example, so that a plurality of locations can be detected at the same time.

Using a predetermined speed detection pattern provided on the wafer, the rotation speed detection sensor 218 constituting the wafer rotation speed detection mechanism receives a luminance signal for generating a rotation speed detection signal for detecting the rotation speed of the wafer rotation direction drive unit 219 and the wafer 215 itself installed on the wafer 215. The luminance signal received by the rotation speed detection sensor 218 is input to a rotation speed detection signal generation circuit 222. The rotation speed detection signal generation circuit 222 generates a rotation speed detection signal for controlling the rotation speed of the wafer rotation direction drive unit 219 based on the luminance signal having been input, and outputs the rotation speed detection signal to a rotation speed control circuit 223. Note that the rotation speed detection sensor 218 is implemented by, for example, an optical rotary encoder, but is not necessarily an optical sensor. The input to the rotation speed detection signal generation circuit 222 is not necessarily a luminance signal, and may be another implementation means.

When the rotation speed of the wafer rotation direction drive unit 219 is changed, a target rotation speed is input from a controller 203 to the rotation speed control circuit 223. The rotation speed control circuit 223 generates a rotation speed control signal such that the rotation speed of the wafer rotation direction drive unit 219 becomes a target rotation speed input from the controller 203, and outputs the rotation speed control signal to a rotation direction drive circuit 224. The rotation speed control circuit 223 is implemented by, for example, a speed feedback control system. The rotation direction drive circuit 224 generates a drive signal for driving the wafer rotation direction drive unit 219 based on the rotation speed control signal having been input, and outputs the drive signal to the wafer rotation direction drive unit 219. Thus, the wafer rotation direction drive unit 219 can achieve control of the target rotation speed.

The wafer translation direction drive unit 220 includes therein a translation direction position detection sensor (not illustrated) that detects a position of a movable portion of the wafer translation direction drive unit 220. The translation direction position detection sensor detects the position of the movable portion of the wafer translation direction drive unit 220 by optically detecting a pattern in a scale portion having a predetermined position detection pattern provided in the wafer translation direction drive unit 220, for example. Furthermore, based on the input from the translation direction position detection sensor, the translational position detection signal generation circuit included in the wafer translation direction drive unit 220 outputs a position signal of the movable portion of the wafer translation direction drive unit 220. The output position signal of the movable portion of the translation direction drive unit 220 is input to a translation position control circuit 225. Note that the translation direction position detection sensor is not necessarily of an optical detection method, and may be of another implementation means.

When the position of the movable portion of the wafer translation direction drive unit 220 is changed, the target position in the translation direction is input from the controller 203 to the translation direction position control circuit 225. The translation direction position control circuit 225 generates a position control signal such that the position of the movable portion of the wafer translation direction drive unit 220 becomes a target position input from the controller 203, and outputs the position control signal to the translation direction drive circuit 226. The translation direction position control circuit 225 is implemented by, for example, a position feedback control system. The translation direction drive circuit 226 generates a drive signal for driving the wafer translation direction drive unit 220 based on the position control signal having been input, and outputs the drive signal to the wafer translation direction drive unit 220. Thus, the wafer translation direction drive unit 220 can achieve control of the target translational position.

Figure 3:
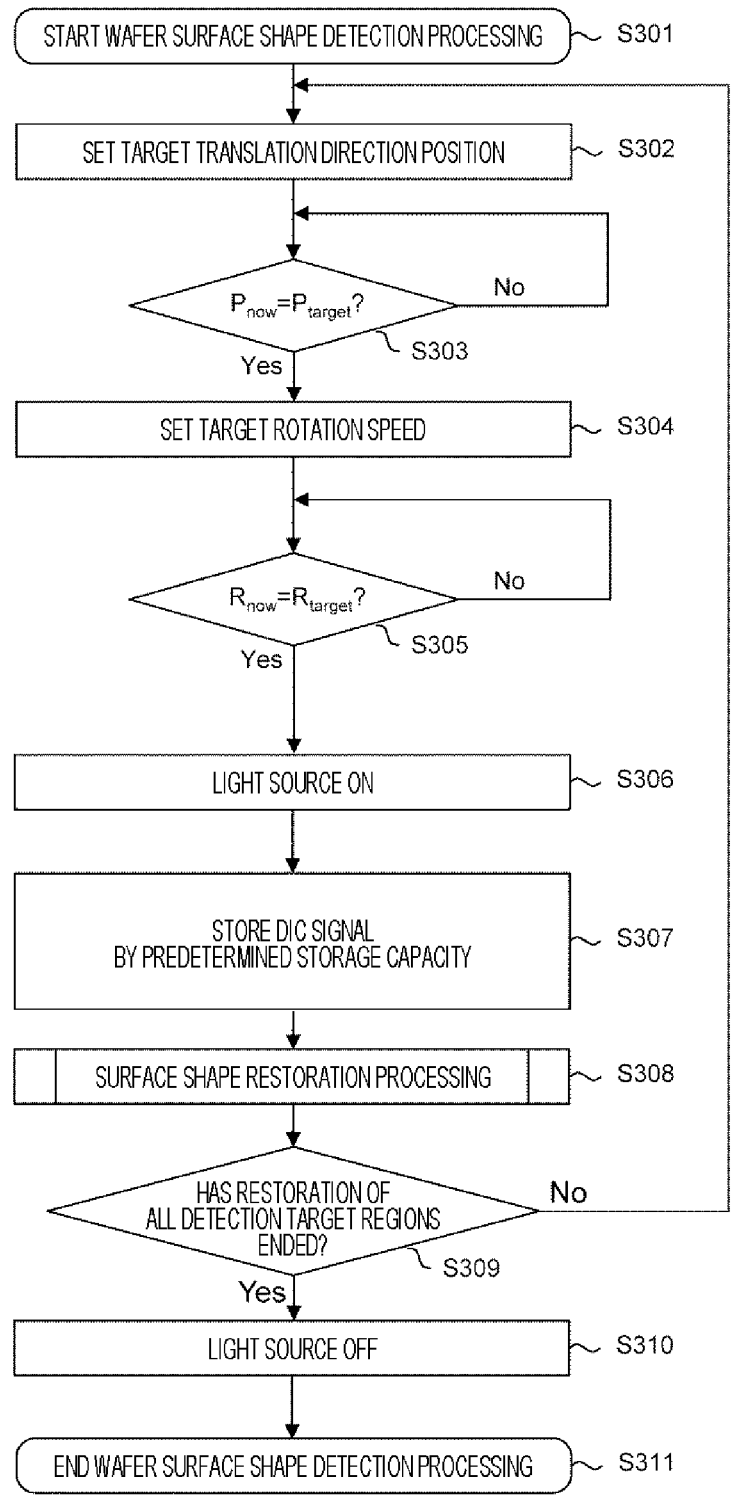
FIG. 3 is a view illustrating a flowchart of detection processing of a surface shape of a wafer according to the first embodiment.

The detection processing of the surface shape of the wafer 215 in the surface shape detection device of the present embodiment will be described with reference to FIGS. 2 and 3. FIG. 3 illustrates a flowchart of the detection processing of the surface shape of the wafer 215.

When the detection processing of the surface shape of the wafer 215 is started (step S301), the controller 203 sets the target position in the translation direction in the translation direction position control circuit 225 from the external control device 202 via the input/output control circuit 201 (step S302). Here, the target position in the translation direction is determined based on the input of a rotation synchronization signal generated by the rotation speed control circuit 223. After the target position in the translation direction is set, the process proceeds to step S303.

In step S303, it is determined whether or not the position of the movable portion of the translation direction drive unit 220 has become the target position. For example, it is determined whether or not the difference between a current position Pnow of the movable portion of the wafer translation direction drive unit 220 and a target position Ptarget in the translation direction has converged within a predetermined range. When it is determined in step S303 that the position of the movable portion of the translation direction drive unit 220 has not become the target position (No in step S303), the process proceeds to step S303 again. That is, step S303 is repeated until the feedback control of Pnow in the translation direction position control circuit 225 converges to Ptarget. When it is determined in step S303 that the position of the movable portion of the translation direction drive unit 220 has become the target position (Yes in step S303), the process proceeds to step S304.

In step S304, the target rotation speed is set to the rotation speed control circuit 223 from the controller 203 via the input/output control circuit 201 from the external control device 202, and then the process proceeds to step S305. In step S305, it is determined whether or not the rotation speed of the wafer rotation direction drive unit 219 has become the target rotation speed. For example, it is determined whether or not the difference between a current rotation speed Rnow of the wafer rotation direction drive unit 219 and a target rotation speed Rtarget has converged within a predetermined range. When it is determined in step S305 that the rotation speed of the wafer rotation direction drive unit 219 has not become the target rotation speed (No in step S305), the process proceeds to step S305 again. That is, step S305 is repeated until the feedback control of Rnow in the rotation speed control circuit 223 converges to Rtarget. When it is determined in step S305 that the rotation speed of the wafer rotation direction drive unit 219 has become the target rotation speed (Yes in step S305), the process proceeds to step S306.

In step S306, a signal for turning on the light source is input from the controller 203 to a light source drive circuit 204. As a result, a drive signal for turning on the light source 205 is input from the light source drive circuit 204. As an example of the light source 205, for example, a laser diode is used. After the light source is turned on in step S306, the process proceeds to step S307. The processing performed by the optical system and the signal processing system of the surface shape detection device 200 between steps S306 and S307 will be described below.

When a drive signal for turning on by the light source drive circuit 204 is input, a light beam is emitted from the light source 205. At this time, the light beam is emitted by a polarizer (not illustrated) built in the light source 205 while changing its polarization state to specific linearly polarized light. For example, the light beam emitted from the light source 205 is assumed to be P-polarized light. The light flux of the emitted light beam is made substantially parallel to the optical axis by a collimator lens 206. The light beam having passed through the collimator lens 206 is transmitted through a polarizing beam splitter 207 that is optically designed to reflect S-polarized light and transmit P-polarized light. The light beam transmitted through the polarizing beam splitter 207 is transmitted through a λ/4 wavelength plate 208 and a λ/8 wavelength plate 209 to change its polarization state. The light beam transmitted through the λ/8 wavelength plate 209 is divided into two light beams so as to have a predetermined shift amount d (shear amount) with respect to the direction in which the surface shape is desired to be detected by a polarizing prism 210. For example, the shift direction of the two light beams by the polarizing prism is set to a direction substantially perpendicular to the radial direction of the wafer 215. The polarizing prism 210 is implemented by, for example, a Wollaston prism.

The divided two light beams become light beams substantially parallel to each other by an objective lens 211. The both two light beams pass through a first relay lens 212 and a second relay lens 213 and are incident substantially perpendicularly to the wafer surface of the wafer 215 by a falling mirror 214. The two light beams reflected on the surface of the wafer 215 pass through substantially the same path as that at the time of incidence in the opposite direction, and become one light beam again in the polarizing prism 210 to interfere. By being transmitted through the λ/8 wavelength plate 209 and the λ/4 wavelength plate 208, the interference light changes its polarization state. The interference light transmitted through the λ/4 wavelength plate 208 is reflected by the polarizing beam splitter 207 toward the light receiving element 217 side. The interference light reflected by the polarizing beam splitter 207 is imaged on the light receiving element 217 by an imaging lens 216 and received.

The luminance signal of the interference light received by the light receiving element 217 is converted into a voltage signal in the interference light signal processing circuit 227 of the surface shape restoration processing unit described above, and then converted into a digital signal at predetermined sampling time intervals Ts by the ADC 228.

After the series of processing described above, in step S307, the luminance signal (differential interference contrast, hereinafter, a DIC signal) of the interference light that has become a digital signal by the ADC 228 is stored by the buffer unit 229 by a predetermined storage capacity. After step S307, the process proceeds to step S308. In step S308, the restoration processing of the surface shape of the wafer 215 is performed by the wafer surface shape restoration unit 230 for each DIC signal having a predetermined storage capacity stored in the buffer unit 229. Details of the surface shape restoration processing by the wafer surface shape restoration unit 230 of the surface shape restoration processing unit will be described later.

After the surface shape restoration processing in step S308 finished, the process proceeds to step S309. In step S309, it is determined whether or not the restoration processing of the entire detection target region has ended. If it is determined in step S309 that the restoration processing of the entire detection target region has not ended (No in step S309), the process proceeds to step S302, and the processing from step S302 to step S308 is performed again. If it is determined in step S309 that the restoration processing of the entire detection target region has ended (Yes in step S309), the process proceeds to step S310.

In step S310, a signal for turning off the light source is input from the controller 203 to the light source drive circuit 204. As a result, a drive signal for turning off the light source 205 is input from the light source drive circuit 204. When step S310 is performed, the wafer surface shape detection processing ends (step S311). In the series of wafer surface shape detection processing, at the time of an error (not illustrated) such as that the movable portion of the wafer translation direction drive unit 220 has failed to move to the target position in the translation direction or that the rotation speed of the wafer rotation direction drive unit 219 has failed to become the target rotation speed, the wafer surface shape detection processing ends with an error code left.

In FIG. 2, as an example, the surface shape restoration unit is described as the same housing included in the surface shape restoration device 200. However, the device configuration is not limited to this. For example, the buffer unit 229 and the wafer surface shape restoration unit 230 that constitute the surface shape restoration unit may be separate housings such as a server PC in which one or both of them are connected on a network communicable with the surface shape restoration device. The configuration of the separate housing may be any of a configuration where the corresponding function is implemented in the external control device 202 or a configuration where the corresponding function is implemented in the separate housing different from the external control device 202.

Next, a configuration example of the differential interference optical system 221 as a feature of the surface shape detection device 200 of the present embodiment will be described. As illustrated in FIG. 1, in the conventional differential interference optical system, the shear amount d is designed to be smaller than the sampling pitch ps. This is because, by reducing the shear amount d as much as possible, the phase difference Δh between two light beams between the shear amounts d can be treated to be approximated to an ideal differential value as in Expression 1.

Figure 4:
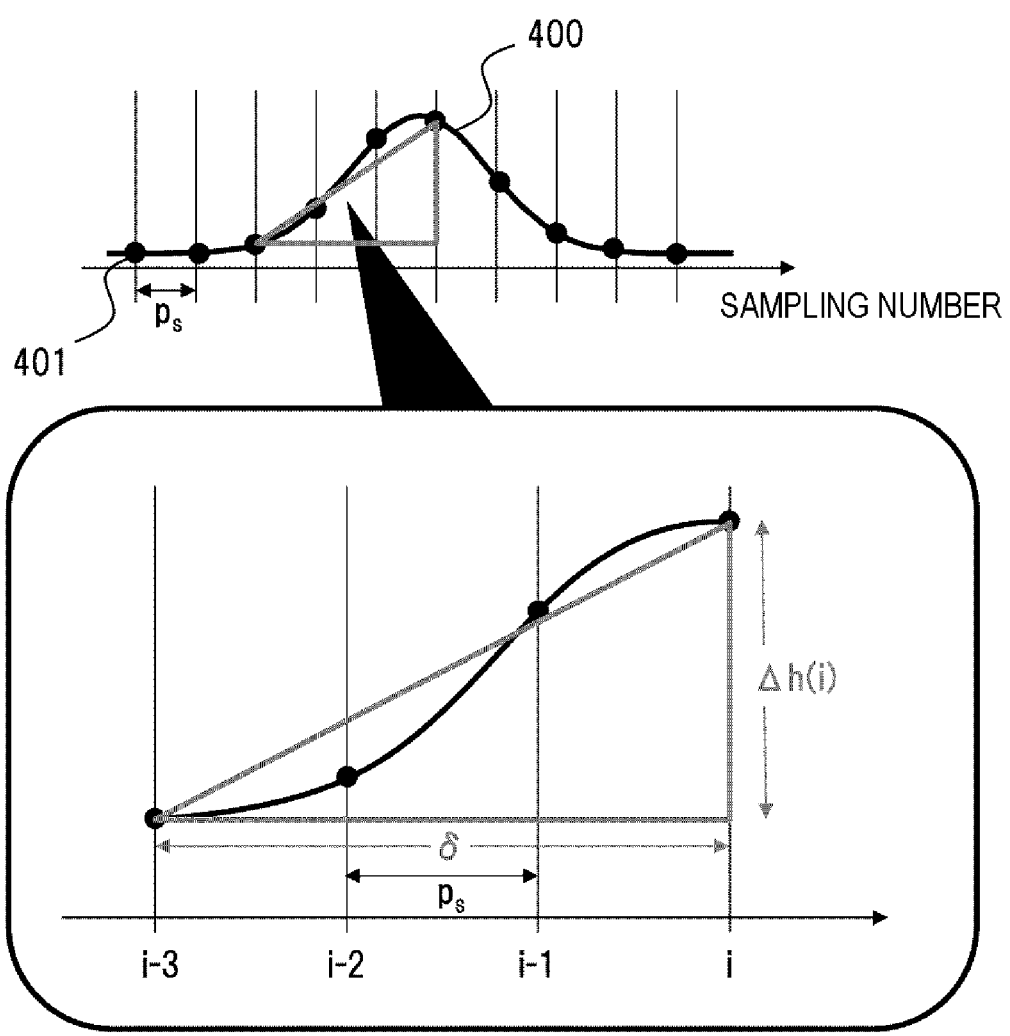
FIG. 4 is a schematic view of a differential interference optical system in a case where a shear amount is larger than a sampling pitch according to the first embodiment.

On the other hand, as in the schematic view illustrated in FIG. 4, the interference optical system in the present embodiment is characterized in that the shear amount d is larger than the sampling pitch ps. FIG. 4 illustrates, as an example, a case where the shear amount d is exactly three times the sampling pitch ps. As described above, in the wafer surface shape restoration unit 230 in the surface shape detecting device 200, the surface shape restoration processing is performed for each DIC signal of a predetermined capacity stored in the buffer unit 229.

In the surface shape restoration processing in the conventional differential interference optical system, the surface shape of the wafer 215 is restored by the integration of the differential value as in Expression 2 or the integration as in Expression 3. However, in a case where the relationship of d>ps is established, i.e., in a case where the predetermined design distance is larger than the quantization distance interval corresponding to the predetermined quantization time interval as in the present embodiment, the phase difference Δh between the two light beams between the shear amounts d cannot be approximated as the differential value as in Expression 1 because the shear amount d is large, and the surface shape of the wafer 215 cannot be accurately restored. Therefore, in the wafer surface shape restoration unit 230 according to the present embodiment, the integration is performed not for each sampling pitch ps as conventionally but for each shear amount d.

Figure 5:
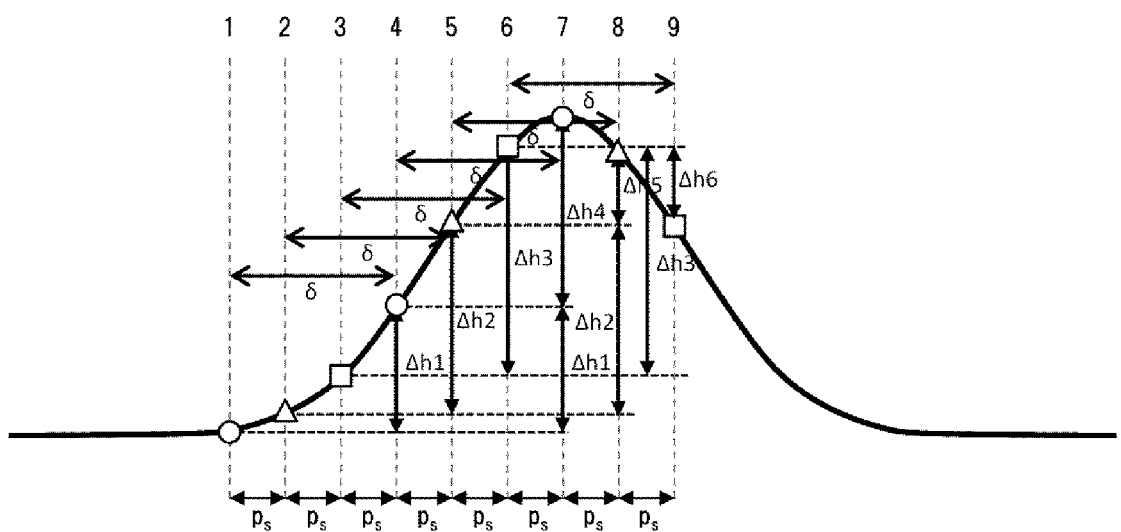
FIG. 5 is a schematic view illustrating a concept of surface shape restoration according to the first embodiment.

FIG. 5 shows a schematic view illustrating the concept of surface shape restoration in the present embodiment. As in FIG. 4, FIG. 5 illustrates a case where the shear amount d is exactly three times the sampling pitch ps. The heights corresponding to the positions of the symbols of white circles, triangles, and squares in FIG. 5 each represent the surface shape of the wafer 215 at the sampling timing. The same symbol is arranged exactly every three times the sampling pitch ps. For the sake of simplicity, FIG. 5 only shows the timing of the total of nine times of sampling from 1 to 9. In the fourth sampling (circle), the integration target is the first sampling (circle) that is separated by exactly the shear amount d (corresponding to three times the sampling pitch ps), and a difference value Δh1 of the surface shape is subjected to the integration calculation. In the seventh sampling (circle), the integration target is the fourth sampling (circle) that is separated by exactly the shear amount d, which corresponds to three times the sampling pitch ps, and a difference value Δh4 of the surface shape is integrated. Similarly, triangles separated by the shear amount d are integrated together, and squares separated by the shear amount d are integrated together.

In other words, according to the surface shape restoration of the present embodiment, integration is performed by adding the shift amount of the phase plane in the separation direction of the plurality of light spots calculated from the information of the interference light detected at the current quantization timing to the value of the surface shape restored at the quantization timing that is previous by the predetermined number of times of quantization.

Thus, the integration is carried out for each sample separated by the shear amount d. Since the sampling pitch ps is not changed, it is known that the resolution is not changed from that at the time of the conventional surface shape restoration illustrated in FIG. 1. At this time, the calculation of the surface shape h(i) of the wafer 215 in the i-th sample in the wafer surface shape restoration unit 230 is expressed by Expression 6. Here, Int is an integer value represented by Expression 7, and the calculation symbol rounddown represents an integer rounding operator in the zero direction.

[Expression 6]

$$h(i) = h(i - Int) + \Delta h(i) \qquad \text{(Expresssion 6)}$$

[Expression 7]

$$Int = \text{rounddown}\left(\frac{\delta}{p_s}\right) \qquad \text{(Expresssion 7)}$$

Similarly to Expression 3, Δh(i) represents the shift amount of the phase plane in the shift direction of the shear amount in the i-th sampling. In the addition value at the time of integration, by treating Δh(i) not as a differential value or a change rate but as a shift of the phase plane in the shift direction of the pure shear amount, the surface shape of the wafer 215 can be accurately restored even when d>ps.

FIGS. 4 and 5 illustrate an ideal state in which the shear amount d is an integral multiple of the sampling pitch ps, i.e., an integral multiple that is a quotient obtained by dividing the shear amount, which is a predetermined design distance, by the sampling pitch ps, which is a quantization distance interval. That is, the surface shape restoration processing unit performs calculation based on the value of the surface shape restored at the quantization timing that is previous by the predetermined number of times of quantization, and the predetermined number of times of quantization corresponds to the quotient obtained by dividing a predetermined design distance by a quantization distance interval.

However, in the differential interference optical system in the actual surface shape detection device 200, the shear amount d is not necessarily an integral multiple of the sampling pitch ps. In other words, the calculation is performed based on the value of the surface shape restored at the quantization timing before the predetermined number of quantization (sampling) times, and this predetermined number of times of quantization does not necessarily correspond to the quotient obtained by dividing the predetermined design distance by the quantization distance interval.

Figure 6:
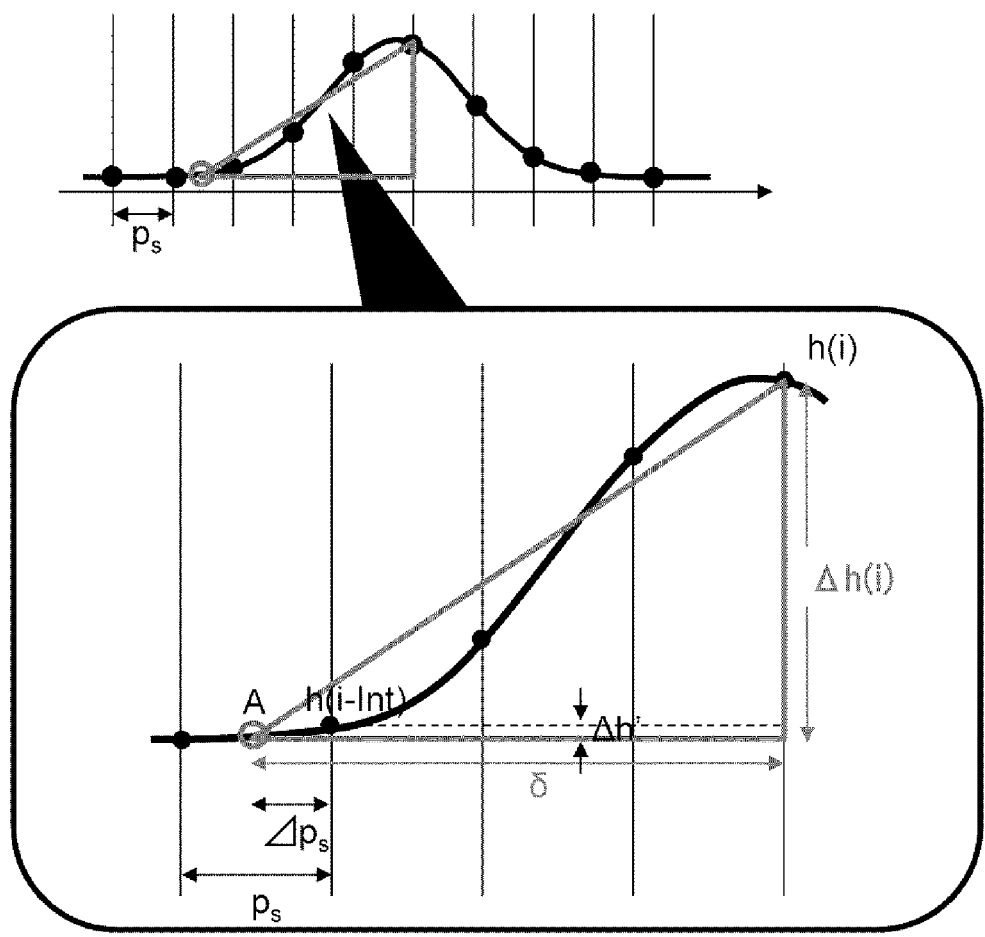
FIG. 6 is a schematic view of a case where a shear amount according to the first embodiment is not an integral multiple of a sampling pitch.

FIG. 6 illustrates a schematic view of a case where the shear amount d is not an integral multiple of the sampling pitch, i.e., a case where the predetermined number of times of quantization does not correspond to the quotient obtained by dividing a predetermined design distance by a quantization distance interval. The integration target in the surface shape h(i) of the wafer 215 in the i-th sample is the value at a point A indicated by the position of the hollow circle in FIG. 6 separated by the shear amount d. However, the position is present between the sampling pitches, and its value cannot be obtained.

Since the value that can be obtained by sampling is a value of h(i-Int), it is known that there is a difference in the height direction by Δh' as compared with the point A, which is the actual surface of the wafer 215. Therefore, the wafer surface shape restoration unit 230 performs correction processing to a value digitally sampled by a height corresponding to Δh' in the surface shape restoration processing of the wafer 215. The calculation of the surface shape h(i) in the wafer surface shape restoration unit 230 in a case where the shear amount d is not an integral multiple of the sampling pitch is expressed by Expression 8. Examples of a method of deriving the height corresponding to Δh' in Expression 8 include linear interpolation processing.

[Expression 8]

$$h(i) = h(i\text{-Int}) + \Delta h(i) - \Delta h' \quad \text{(Expression 8)}$$

In the case of using linear interpolation processing, for example, Δh' is expressed by Expression 9. Here, Δps in Expression 9 is expressed by Expression 10.

[Expression 9]

$$\Delta h' = \frac{\Delta p_s}{p_s} \{h(i - Int) - h(i - Int - 1)\} \quad \text{(Expresssion 9)}$$

[Expression 10]

$$\Delta p_s = \left\{\frac{\delta}{p_s} - \text{rounddown}\left(\frac{\delta}{p_s}\right)\right\} \quad \text{(Expresssion 10)}$$

In summary, the calculation of the surface shape h(i) in the linear interpolation processing can be expressed by Expression 11.

[Expression 11]

$$h(i) = h(i - Int) + \Delta h_n - \frac{1}{p_s}\left\{\frac{\delta}{p_s} - \text{rounddown}\left(\frac{\delta}{p_s}\right)\right\} \quad \text{(Expresssion 11)}$$
$$\{h(i - Int) - h(i - Int - 1)\}$$

As described above, the wafer surface shape restoration unit 230 performs calculation by linear interpolation processing between the value of the surface shape restored at the quantization timing that is previous by the predetermined number of times of quantization and the value of the surface shape restored at the quantization timing that is one time previous the predetermined number of times of quantization. Then, the linear interpolation processing is performed based on a remainder of the value obtained by dividing the predetermined design distance by the quantization distance interval. That is, the surface shape restoration processing unit performs calculation by linear interpolation processing between the value of the surface shape restored at the quantization timing that is previous by the predetermined number of times of quantization and the value of the surface shape restored at the quantization timing that is one time previous the predetermined number of times of quantization, and this linear interpolation processing is performed based on a remainder of the value obtained by dividing the predetermined design distance by the quantization distance interval.

Note that the method of deriving the height corresponding to Δh' is not necessarily limited to linear interpolation processing, and may be complement processing by another high-order function or the like, for example. Furthermore, the point at which the digital sampling is performed is not necessarily a point in the case of performing the rounding processing on Int in the zero direction by rounddown, but may be a point in the case of performing the rounding processing in the positive infinite direction. That is, in the restoration processing in the wafer surface shape restoration unit 230, the calculation can be performed based on the value of the surface shape restored at the quantization timing that is previous by the predetermined number of times of quantization corresponding to a value obtained by rounding, in a positive infinite direction, a value obtained by dividing the predetermined design distance by the quantization distance interval, or the calculation can be performed based on the value of the surface shape restored at the quantization timing that is previous by the predetermined number of times of quantization corresponding to a value obtained by rounding off a value obtained by dividing the predetermined design distance by the quantization distance interval.

That is, the surface shape restoration processing unit performs calculation based on the value of the surface shape restored at the quantization timing that is previous by the predetermined number of times of quantization. The predetermined number of times of quantization corresponds to a value obtained by rounding, in a positive infinite direction, a value obtained by dividing the predetermined design distance by the quantization distance interval, or a value obtained by rounding off a value obtained by dividing the predetermined design distance by the quantization distance interval.

Note that without necessarily performing the complement processing, the rotation speed control circuit 223 may determine and control the rotation speed of the wafer 215 so that the shear amount d always becomes an integral multiple of the sampling pitch. That is, the light spot scanning unit may control the scanning speed of the light spot so that a remainder of the value obtained by dividing the predetermined design distance by the quantization distance interval becomes zero. For example, in a case where the wafer surface shape restoration unit 230 and the rotation speed control circuit 223 are implemented by a program executed by the central processing unit (CPU), the above-described control of the scanning speed can be implemented by software processing.

Figure 7:
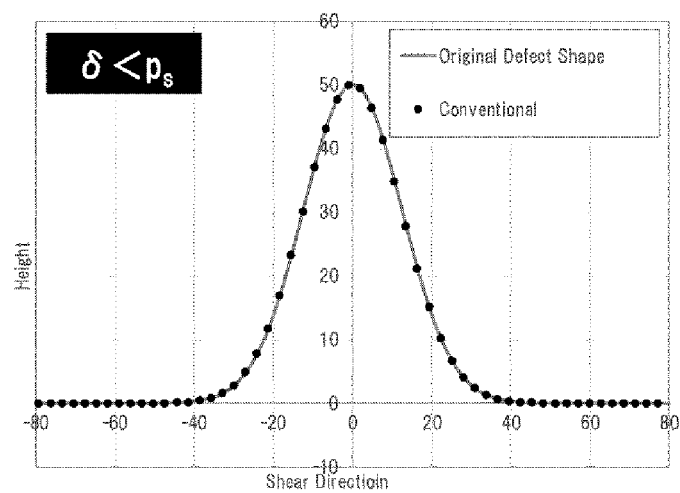
FIG. 7 is a view illustrating a surface shape of a wafer and a simulation result obtained by restoring the surface shape by a conventional differential interference optical system.
Figure 7:
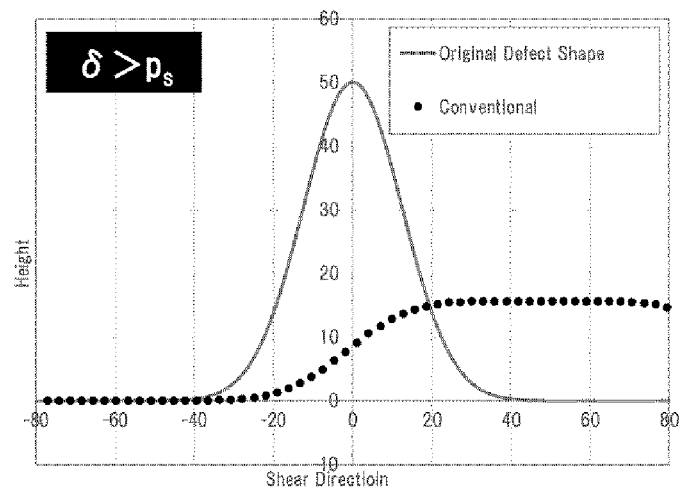
Figure 8:
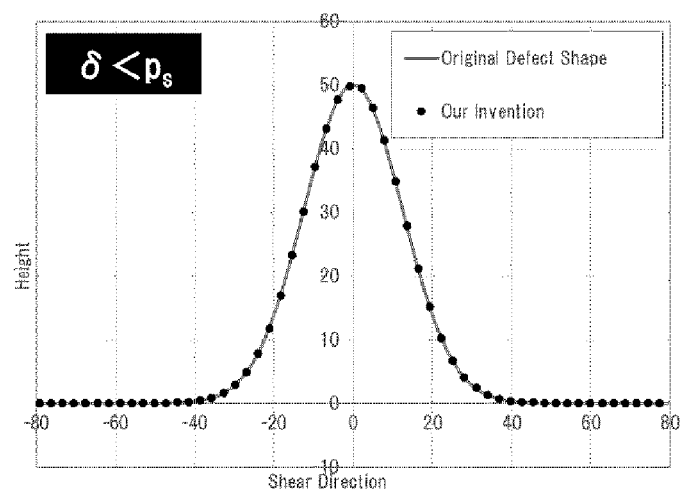
FIG. 8 is a view illustrating a surface shape of a wafer and a simulation result obtained by restoring the surface shape by the differential interference optical system of the first embodiment.
Figure 8:
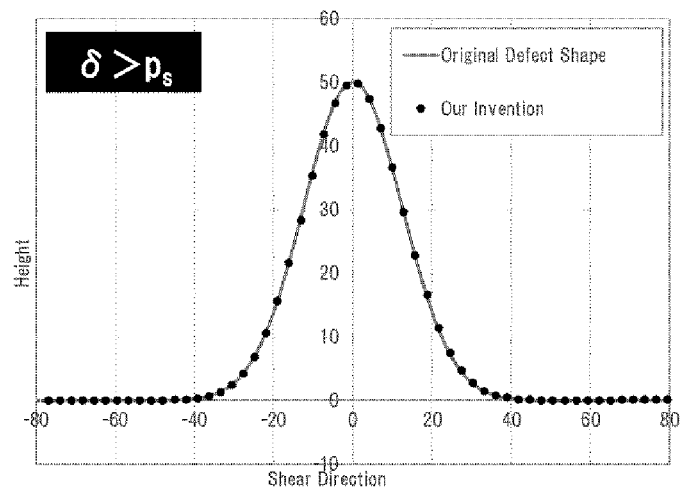

The effects at the time of restoration of the surface shape of the wafer by using the surface shape detection method of the present embodiment will be described with reference to FIGS. 7 and 8. FIGS. 7 and 8 illustrate an ideal state in which there is no influence of random noise. FIG. 7 is a graph in which the surface shape (Original Defect Shape) of the wafer 215 and a state in a case where the surface shape is restored by a conventional differential interference optical system (Conventional) represented by Expression 3 are calculated by simulation.

The upper view of FIG. 7 illustrates a case of the shear amount d<the sampling pitch ps, the lower view of FIG. 7 illustrates a case of the shear amount d>the sampling pitch ps. The solid line in FIG. 7 represents the surface shape of the wafer 215, and the black dots represent the surface shape restored by the conventional differential negotiation optical system having been digitally sampled. As illustrated in the upper part of FIG. 7, in the case of d<ps, the solid line and the black dots overlap, and the surface shape can be accurately restored. However, as illustrated in the lower part of FIG. 7, in the case of d>ps, the solid line and the black dots do not overlap, and the accurate surface shape cannot be restored by the conventional differential interference optical system.

FIG. 8 is a graph in which the surface shape (Original Defect Shape) of the wafer 215 and a state in a case where the surface shape is restored by the differential interference optical system of the present embodiment represented by Expressions 8 and 11 are calculated by simulation. The upper part of FIG. 8 illustrates a case of the shear amount d<the sampling pitch ps, the lower part of FIG. 8 illustrates a case of the shear amount d>the sampling pitch ps. The solid line in FIG. 8 represents the surface shape of the wafer 215, and the black dots represent the surface shape restored by the differential interference optical system of the present embodiment having been digitally sampled. Both in the case of d<ps, illustrated in the lower part of FIG. 8, and in the case of d>ps, illustrated in the upper part of FIG. 8, the solid line and the black dots overlap, thereby indicating that the differential interference optical system using the present embodiment can accurately restore the surface shape regardless of the relationship between the shear amount d and ps.

Figure 9:
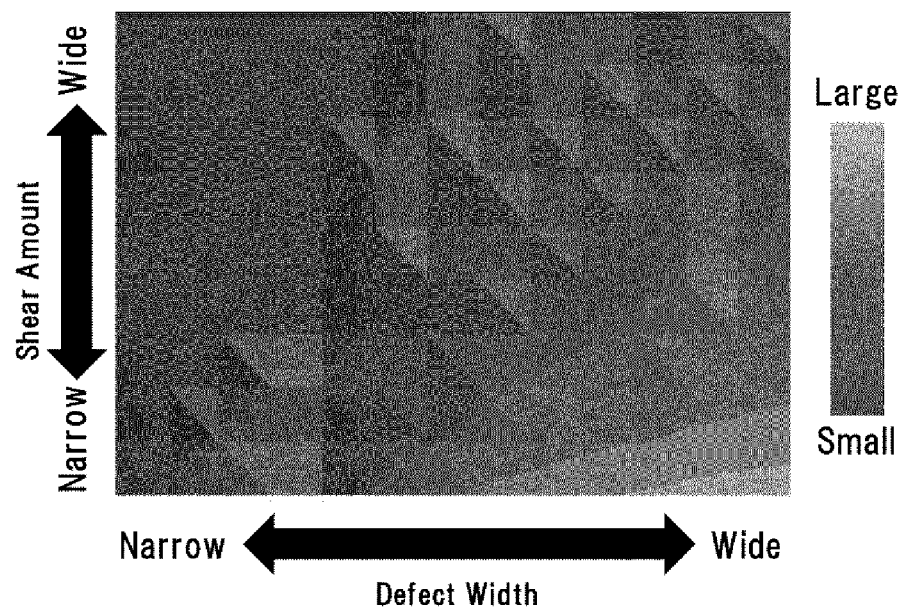
FIG. 9 is a view illustrating a simulation result of a recovery error using the configuration of the first embodiment as a two-dimensional map with respect to the shear amount and the width of the surface shape of the detection target.

The reduction effects of the restoration error due to random noise at the time of restoration of the surface shape of the wafer 215 by using the present embodiment will be described with reference to FIG. 9. FIG. 9 is a view of the restoration error using the present embodiment simulated as a two-dimensional map with respect to the shear amount d (Shear Amount) and the width (Defect Width) of the surface shape that is the detection target, in a case where there is random noise caused by circuit noise or the like.

Here, it is assumed that the width of the surface shape at the time of simulation is the width of the Gaussian shape and the restoration error is a difference value between the maximum value (the vertex of the Gaussian) of the original surface shape and the maximum value at the time of restoration. In the conventional differential interference optical system having the relationship of the shear amount d<the sampling pitch ps, regardless of the value of the shear amount s, as the width of the surface shape increases, i.e., as the number of times of integration increases, the random noise is also integrated, and the restoration error increases. On the other hand, in the case of using the present embodiment having the relationship of the shear amount d<the sampling pitch ps, it is indicated that the restoration error decreases as the shear amount d increases. This is because as the shear amount d increases, the number of times of integration necessary for restoration of the surface shape having the same width can be reduced, and eventually the number of times of addition of random noise can be reduced.

As described above in detail, according to the configuration and operation of the surface shape detection device of the present embodiment, it is possible to restore the surface shape with a small restoration error while maintaining the resolution without trade-off of the resolution in the measurement of the surface shape as conventionally.

The present invention is not limited to the above-described embodiment, and includes various modifications. For example, the embodiment described above is described in detail for the purpose of better understanding of the present invention, and is not necessarily limited to that having all the configurations in the description. Furthermore, while the above-described configurations, functions, control circuits, and the like have been described mainly by example of creation of a program for implementing some or all of them, it is needless to say that some or all of them may be implemented by hardware, for example, by designing them with an integrated circuit. That is, all or some of the functions of the control circuit may be implemented by, for example, an integrated circuit such as an application specific integrated circuit (ASIC) or a field programmable gate array (FPGA) instead of the program.

REFERENCE SIGNS LIST 200 surface shape detection device
201 input/output control circuit
202 external control device
203 controller
204 light source drive circuit
205 light source
206 collimator lens
207 polarizing beam splitter
208 $\lambda/4$ wavelength plate
209 $\lambda/8$ wavelength plate
210 polarizing prism
211 objective lens
212 first relay lens
213 second relay lens
214 falling mirror
215 wafer
216 imaging lens
217 light receiving element
218 wafer rotation speed detection mechanism
219 wafer rotation direction drive unit
220 wafer translation direction drive unit
221 differential interference optical system
222 rotation speed detection signal generation circuit
223 rotation speed control circuit
224 rotation direction drive circuit
225 translation position control circuit
226 translation direction drive circuit
227 interference light signal processing circuit
228 ADC
229 buffer unit
230 wafer surface shape restoration unit

The invention claimed is:

1. A surface shape detection device, comprising:
a light spot scanning unit configured to scan a surface of an inspection target with a light spot;
an interference light detection mechanism configured to detect interference light of light obtained by scanning the surface of the inspection target with a plurality of the light spots separated by a predetermined design distance; and
a surface shape restoration processing unit that is configured to:
sample, at a predetermined quantization time interval, and
calculate information of the interference light by linear interpolation processing between a value of a surface shape restored at quantization timing that is previous by a predetermined number of times and a value of a surface shape restored at quantization timing that is one time previous the predetermined number of times of quantization, wherein the predetermined number of times corresponds to a quotient obtained by dividing the predetermined design distance by a quantization distance interval, and perform restoration processing on a surface shape of the inspection target, wherein the predetermined design distance is larger than the quantization distance interval corresponding to the predetermined quantization time interval.

2. The surface shape detection device according to claim 1, wherein the surface shape restoration processing unit performs the calculation based on a value of a surface shape restored at quantization timing that is previous by the predetermined number of times of quantization, and the predetermined number of times of the quantization corresponds to a value obtained by rounding, in a positive infinite direction, a value obtained by dividing the predetermined design distance by the quantization distance interval.

3. The surface shape detection device according to claim 1, wherein the surface shape restoration processing unit performs the calculation based on a value of a surface shape restored at quantization timing that is previous by the predetermined number of times of quantization, and the predetermined number of times of the quantization corresponds to a value obtained by rounding off a value obtained by dividing the predetermined design distance by the quantization distance interval.

4. The surface shape detection device according to claim 1, wherein the linear interpolation processing is performed based on a remainder of a value obtained by dividing the predetermined design distance by the quantization distance interval.

5. A surface shape detection device comprising:

a light spot scanning unit configured to:
  scan a surface of an inspection target with a light spot, and
  control a scanning speed of the light spot so that a remainder of a value obtained by dividing a predetermined design distance by a quantization distance interval becomes zero;

an interference light detection mechanism configured to detect an interference light of light obtained by scanning the surface of the inspection target with a plurality of the light spots separated by the predetermined design distance; and a surface shape restoration processing unit configured to samples, at a predetermined quantization time interval, calculates information of the interference light that is detected, and performs restoration processing on a surface shape of the inspection target, wherein the predetermined design distance is larger than the quantization distance interval corresponding to the predetermined quantization time interval.

6. The surface shape detection device according to claim 1, wherein
the interference light detection mechanism separates the light spot into a plurality of light spots by the predetermined design distance according to a polarization state of incident light.

7. The surface shape detection device according to claim 1, wherein
the inspection target is a wafer,
the light spot scanning unit includes a wafer rotation direction drive unit that rotates the wafer and a wafer rotation speed detection mechanism that detects a rotation speed of the wafer, and
the predetermined quantization time interval is determined based on a synchronization signal that the wafer rotation speed detection mechanism has generated by reading synchronization information added to the wafer.

8. The surface shape detection device according to claim 1, wherein
the interference light detection mechanism includes a plurality of light receiving units in a direction substantially perpendicular to a scanning direction of the light spot scanning unit.

9. A surface shape detection method, comprising:
detecting interference light of light obtained by scanning a surface of an inspection target with a plurality of light spots separated by a predetermined design distance,
sampling, at a predetermined quantization time interval, and
calculating information of the interference light by linear interpolation processing between a value of a surface shape restored at quantization timing that is previous by a predetermined number of times of quantization and a value of a surface shape restored at quantization timing that is one time previous the predetermined number of times of the quantization, wherein the predetermined number of times corresponds to a quotient obtained by dividing the predetermined design distance by a quantization distance interval; and
when restoration processing is performed on a surface shape of the inspection target, making the predetermined design distance larger than the quantization distance interval corresponding to the predetermined quantization time interval.

10. The surface shape detection method according to claim 9, comprising:
adding a shift amount of a phase plane in a separation direction of a plurality of the light spots calculated from information of the interference light detected at current quantization timing to a value of a surface shape restored at quantization timing that is previous by the predetermined number of times of quantization.

11. The surface shape detection method according to claim 10, wherein
the linear interpolation processing is performed based on a remainder of a value obtained by dividing the predetermined design distance by the quantization distance interval.

* * * * *